United States Patent
Okamura et al.

(10) Patent No.: US 10,747,199 B2
(45) Date of Patent: Aug. 18, 2020

(54) OPERATION MANAGEMENT DEVICE

(71) Applicant: FANUC CORPORATION, Yamanashi (JP)

(72) Inventors: Yasumasa Okamura, Yamanashi (JP); Kazuhiro Koizumi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 39 days.

(21) Appl. No.: 16/143,473

(22) Filed: Sep. 27, 2018

(65) Prior Publication Data
US 2019/0094835 A1  Mar. 28, 2019

(30) Foreign Application Priority Data
Sep. 28, 2017 (JP) ................. 2017-188879

(51) Int. Cl.
| G05B 19/4065 | (2006.01) |
| G05B 19/401 | (2006.01) |
| G05B 19/418 | (2006.01) |

(52) U.S. Cl.
CPC ....... *G05B 19/4065* (2013.01); *G05B 19/401* (2013.01); *G05B 19/4183* (2013.01)

(58) Field of Classification Search
CPC .............. G05B 19/4065; G05B 19/401; G05B 19/4183; G05B 2219/35289; G05B 2219/35293; G05B 2219/37431; G05B 19/4067; G05B 19/406
See application file for complete search history.

(56) References Cited

U.S. PATENT DOCUMENTS

| 6,308,141 B1 | 10/2001 | Saito et al. |
| 2009/0198370 A1 | 8/2009 | Nishi et al. |
| 2016/0292237 A1 | 10/2016 | Sato |
| 2017/0227945 A1* | 8/2017 | Wang .................. G06F 17/5009 |
| 2018/0162066 A1* | 6/2018 | Bruwer .................. B33Y 30/00 |
| 2018/0246495 A1 | 8/2018 | Meier et al. |
| 2018/0246502 A1* | 8/2018 | Meier .................... G06T 19/00 |
| 2018/0357873 A1* | 12/2018 | Rischar .................. G08B 19/00 |
| 2019/0001574 A1* | 1/2019 | Yackabonis ........... G06F 3/1208 |

FOREIGN PATENT DOCUMENTS

| JP | H11-170326 A | 6/1999 |
| JP | 2004126956 A | 4/2004 |
| JP | 2005177924 A | 7/2005 |
| JP | 2009116745 A | 5/2009 |
| JP | 2009-181506 A | 8/2009 |
| JP | 201139708 A | 2/2011 |
| JP | 2016189128 A | 11/2016 |

* cited by examiner

*Primary Examiner* — Christopher E. Everett
(74) *Attorney, Agent, or Firm* — Hauptman Ham, LLP

(57) ABSTRACT

An operation management device includes: a machining program information acquisition unit acquiring information related to machining program executed in the machine tool; a signaling information acquisition unit acquiring signaling information related to signals detected during execution of the machining programs in the machine tool; and an associated-information creation unit associating the information related to the machining program with the signaling information; and a search/display unit displaying the information related to the machining program and the signaling information, which are associated by the associated-information creation unit.

7 Claims, 9 Drawing Sheets

OPERATION MANAGEMENT DEVICE

RELATED APPLICATIONS

The present application claims priority of Japanese Patent Application No. 2017-188879, filed on Sep. 28, 2017, the disclosure of which is hereby incorporated by reference herein in its entirety.

BACKGROUND OF THE INVENTION

1. Field of the Invention

The present invention relates to an operation management device, and more particularly, to an operation management device that simultaneously displays visibly a machining program corresponding to signals collected from a machine tool and the signals, and the like.

2. Description of the Related Art

As shown in FIG. 9, in an operation management device that manages operation conditions of a numerically controlled machine tool, a function to display operation performance and various signaling information of the machine tool with graphs, etc., and to allow condition changes corresponding to the time axis to be recognized visually is widely known (Japanese Patent Application Laid-Open No. 2009-181506, Japanese Patent Application Laid-Open No. 11-170326, etc.).

In managing operation conditions of a machine tool, while graph such as shown in FIG. 9 is displayed on a screen, an operator checks a time when axial feed rate is abnormally slow and a time when high-temperature abnormally appears, and then checks tasks conducted and a machining program executed at that time, thereby analyzing a cause of an abnormal condition, and based on the result of the analysis, solving the problem of abnormal conditions.

From the graphs shown in FIG. 9, changes to an abnormal condition can be seen intuitively, but, it is not easy to investigate where the cause of the abnormal condition is. Particularly, if the cause of an abnormal condition is in a machining program, it is difficult to identify which step of a machining program abnormality occurs in.

Also, when there is a particular partial step in a machining program, for example, a partial step that is modified to address a problem which occurred in the past or a partial step that is newly introduced, it is also difficult to check how such a partial step have changed the conditions of the machining operation.

SUMMARY OF THE INVENTION

Thus, an object of the present invention is to provide an operation management device making it possible to easily grasp a relevancy between a machining program and various signaling information.

According to the present invention, the above mentioned object is achieved by providing a means for acquiring execution performance information of machining programs and signaling information detected in a machine tool as information related to operation performance of programs of the machine tool, associating these information with each other and storing them, and searching and displaying the execution performance information of the machining programs and the signaling information to be easily grasped intuitively in response to user's operation.

An operation management device according to an aspect of the present invention is configured to manage operation conditions of a machine tool and includes: a machining program information acquisition unit acquiring information related to machining program executed in the machine tool; a signaling information acquisition unit acquiring signaling information related to signals detected during execution of the machining programs in the machine tool; an associated-information creation unit associating the information related to the machining program with the signaling information; and a search/display unit displaying the information related to the machining program and the signaling information, which are associated by the associated-information creation unit, in a manner such that they are associated with each other.

The present invention allows users to sensuously identify contents of a causative machining program and sensuously investigate influence of each step of the machining program to the processing, when an alarm is issued or when sensor information associated with unstable processing is generated.

BRIEF DESCRIPTION OF THE DRAWINGS

The above-mentioned and other objects and features of the present invention will be apparent from the following description of the embodiment with reference to appended drawings. Among those figures.

DETAILED DESCRIPTION OF THE PREFERRED EMBODIMENTS

A configuration of an operation management device to achieve the present invention is illustrated by way of example below.

Figure 1:
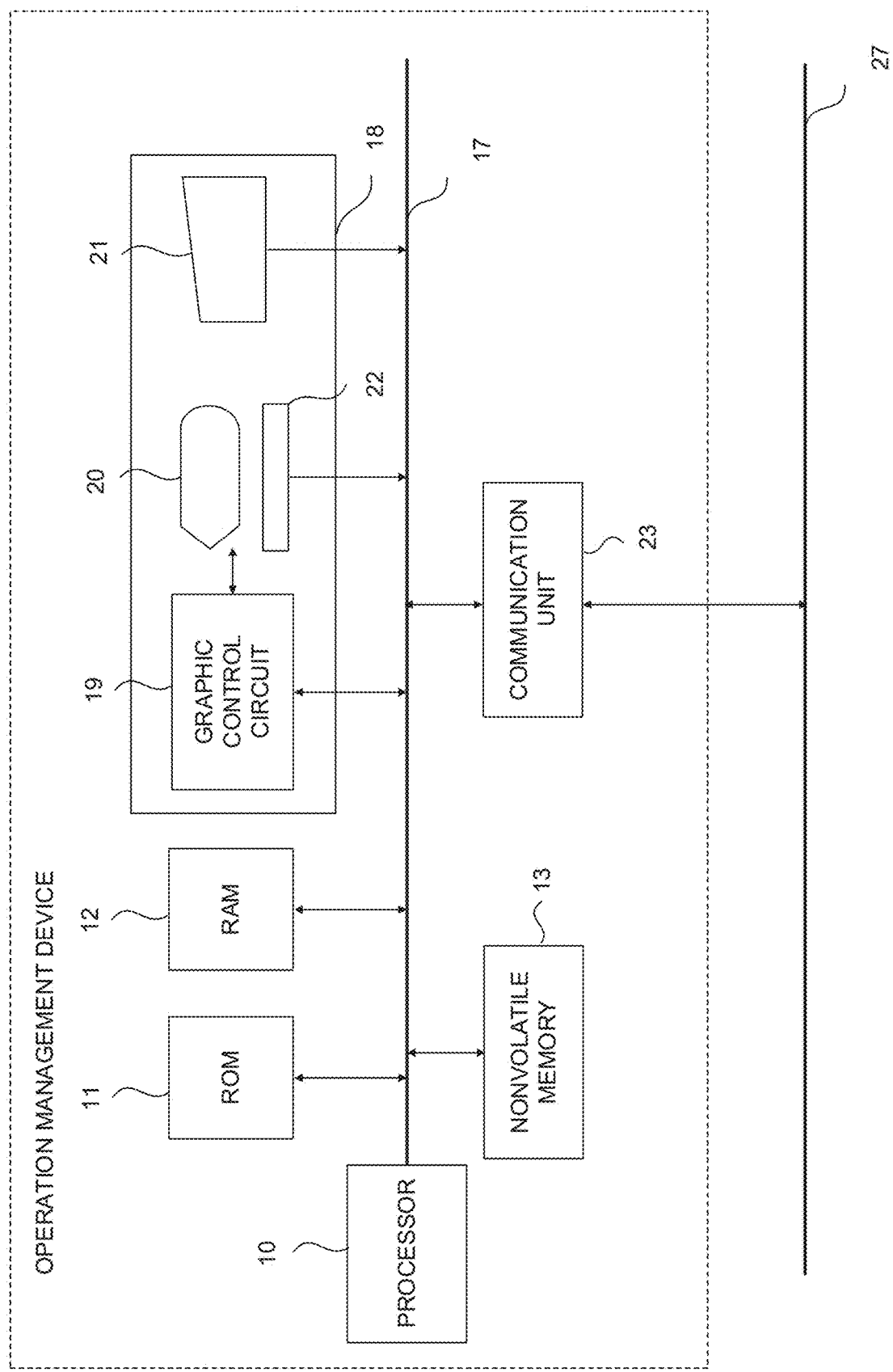
FIG. 1 is a schematic hardware configuration diagram illustrating an essential part of an operation management device in accordance with one embodiment.

FIG. 1 is a schematic hardware configuration diagram illustrating an essential part of an operation management device in accordance with one embodiment. An operation management device 1 in accordance with the present embodiment can be implemented, for example, as a numerical controller. Also, the operation management device 1 in accordance with the present embodiment can be implemented, for example, as a personal computer attached to a machine tool, or the like. Additionally, the operation management device 1 in accordance with the present embodiment can be implemented, for example, as an interference check device provided along with a machine tool, or the like. FIG. 1 shows an example of a hardware configuration of the operation management device 1 implemented as a personal computer.

The operation management device 1 includes a processor 10 as a central component. Each component that the operation management device 1 includes is connected through a bus 17 and exchanges data through the bus 17 each other. The processor 10 controls the whole of the operation management device 1 according to a system program stored in a ROM 11. An EPROM, EEPROM or the like is used for this ROM 11.

For a RAM 12, a DRAM or the like is used, and temporary calculated data, display data, an input/output signal, etc. are stored therein. For a nonvolatile memory 13, a CMOS, SRAM or the like backed up by a battery (not shown) is used, and parameters that should be retained after power deactivation, etc. are stored therein.

User interface equipment 18 is used to display data and figures required for operation of the operation management device 1, and receive a manual operation input, a data input, etc. of an operator, and so on. A graphic control circuit 19 converts digital signals of numeric data and graphic data, etc. into raster signals for display and sends them to a display unit 20, and the display unit 20 displays these numeric values and figures.

A liquid crystal display unit is primarily used for the display unit 20.

An input unit 21 includes keyswitches, a rotary switch, a keyboard including numeric keys, symbolic keys, character keys and function keys, and a pointing device such as a mouse.

A touch panel 22 includes a function to detect operations such as a touch or a drag by an operator. The touch panel 22 is arranged to be superimposed on the screen of the display unit 20, and can detect operations that the operator performed on software keys, software buttons, or software switches displayed on the screen of the display unit 20. It is noted that the touch panel 22 and the display unit 20 may be configured together as a single device.

A communication unit 23 performs data communication between a cell computer and a host computer connected to a network 27, a machine tool (a numerical controller) which is subject to operation management, etc. through the wired/wireless network 27. Machining programs executed in a machine tool which is subject to management, and performance information including information related to execution performance of the machining programs, information related to signals acquired during execution of the machining programs, etc. can be acquired through, for example, the communication unit 23.

Figure 2:
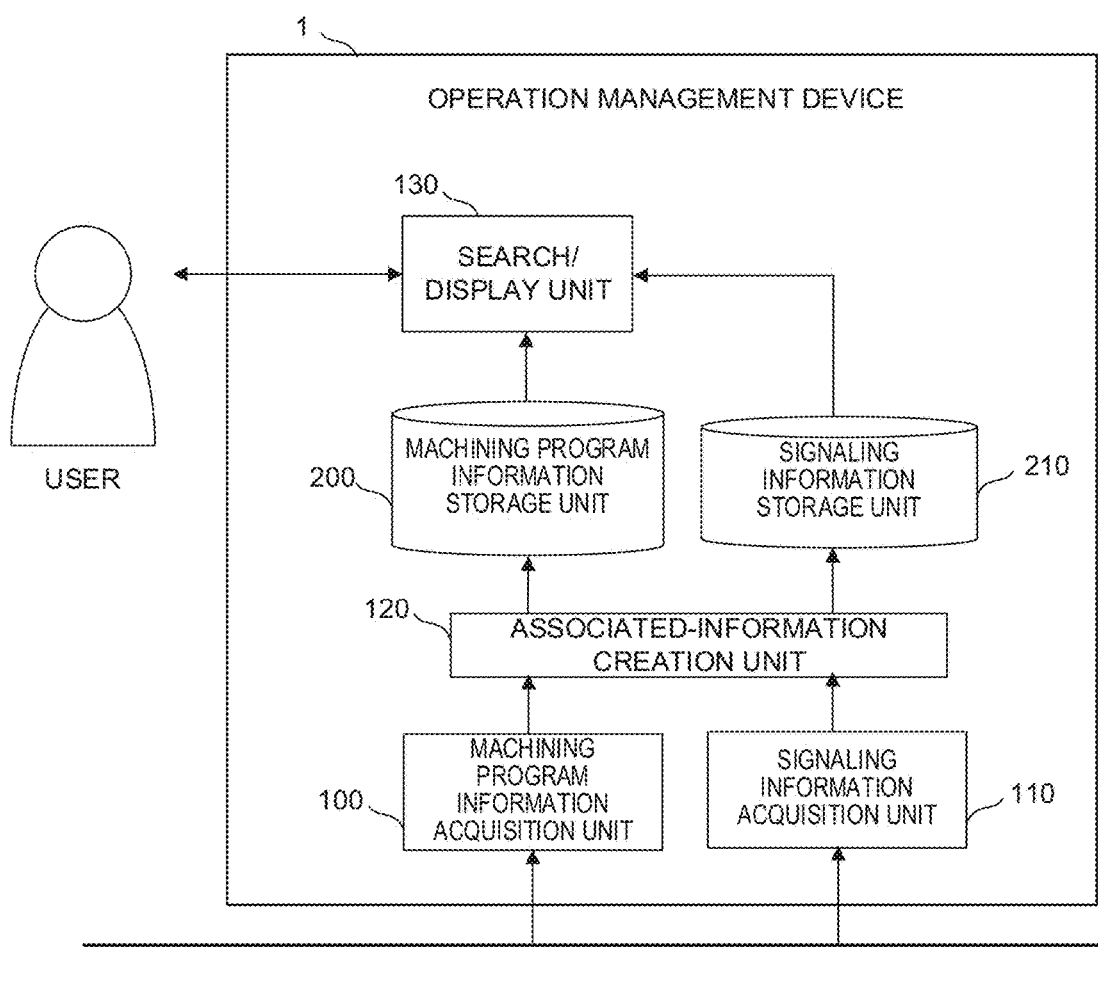
FIG. 2 is a schematic functional block diagram of an operation management device in accordance with one embodiment.

FIG. 2 is a schematic functional block diagram of an operation management device in accordance with one embodiment of the present invention, in a case in which a system program to achieve a search/display function is implemented on the operation management device 1 shown in FIG. 1. Each function block shown in FIG. 2 is achieved by the processor 10, included in the operation management device 1 shown in FIG. 1, executing a system program of a search/display function, and controlling operations of all parts of the operation management device 1. The operation management device 1 of the present embodiment includes a machining program information acquisition unit 100, a signaling information acquisition unit 110, an associated-information creation unit 120, and a search/display unit 130, and also, a machining program information storage unit 200 storing machining programs acquired from a machine tool which is subject to management and execution information of the machining programs, and a signaling information storage unit 210 storing signaling information detected during execution of the machining programs by the machine tool are provided on the nonvolatile memory 13.

The machining program information acquisition unit 100 is a functional means for acquiring information related to machining program (including execution performance information of machining programs) executed in a machine tool which is subject to management of the operation management device 1. Execution performance information of machining programs acquired by the machining program information acquisition unit 100 includes at least machining program identification information that allows machining programs to be uniquely identified and information on time during which each block of the machining programs is executed. Also, if the operation management device 1 manages a plurality of machine tools, execution performance information of machining programs includes at least machine identification information that allows the machine tool which executed the machining programs to be uniquely identified. The machining program information acquisition unit 100 may acquire information related to machining program through the network 27, for example, from a machine tool, or from a cell computer, a host computer, etc. managing the machine tool. Also, the machining program information acquisition unit 100 may acquire information related to machining program through, for example, a storage media such as a CF card.

The signaling information acquisition unit 110 is a functional means for acquiring signaling information detected when machining programs are executed in a machine tool which is subject to management of the operation management device 1. Signaling information acquired by the signaling information acquisition unit 110 includes at least signal identification information that allows detected signals to be uniquely identified, detection values of the signals, and information on time during which the signals are detected. Also, if the operation management device 1 manages a plurality of machine tools, signaling information includes at least machine identification information that allows the machine tool from which the signals are detected to be uniquely identified. The signaling information acquisition unit 110 may acquire signaling information through the network 27, for example, from a machine tool, or from a cell computer, a host computer, etc. managing the machine tool. Also, the signaling information acquisition unit 110 may acquire signaling information through, for example, a storage media such as a CF card.

Signaling information acquired by the signaling information acquisition unit 110 can be any kind of information as long as related to detectable signals in a machine tool which is subject to management, for example, signals indicating operating states of the machine tool, signals acquired from peripheral equipment of the machine tool (opening/closing signals of a safety fence, signals related to operations of a robot, etc.), signals related to control of the machine tool (override signals, etc.), signals acquired by various sensors attached to the machine tool, and so on.

Figure 3:
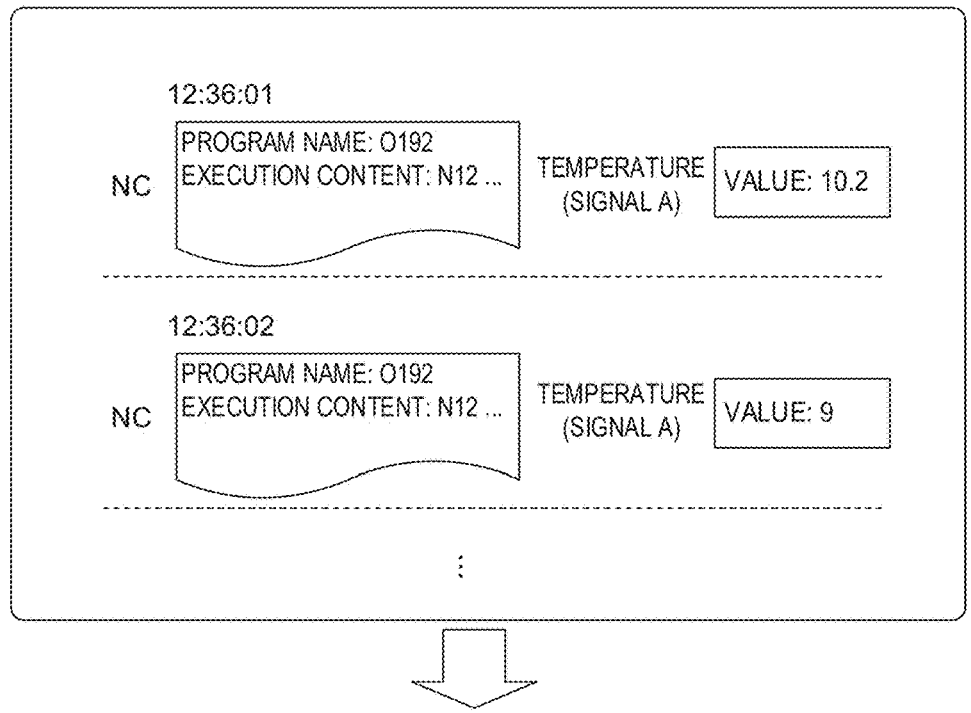
FIG. 3 is a diagram illustrating an example of an association of information related to a machining program with signaling information by an associated-information creation unit.

The associated-information creation unit 120 performs an association of machining program execution performance information included in information related to machining program with signaling information, based on information related to the machining program acquired by the machining program information acquisition unit 100 and the signaling information acquired by the signaling information acquisition unit 110, and stores the machining program execution performance information and the signaling information associated in the machining program information storage unit 200 and the signaling information storage unit 210, respectively. FIG. 3 is a diagram illustrating, by way of example, the machining program execution performance information and the signaling information associated by the associated-information creation unit 120. The associated-information creation unit 120 performs the association of the machining program execution performance information with the signaling information, for example, by adding a block identifier (block ID in FIG. 3) that allows a combination of machine identification information (machine ID in FIG. 3), machining program identification information (program ID in FIG. 3) and a block number to be uniquely identified, to each executed block in the machining program execution performance information, and adding a block identifier of an external block, to the signaling information related to the signals detected at a time when each block is executed. An association of machining program execution performance information with signaling information by the associated-information creation unit 120 can be performed in any way provided that the relation between each block of machining programs executed in a machine tool and signals detected when the block is performed can be grasped.

Figure 4:
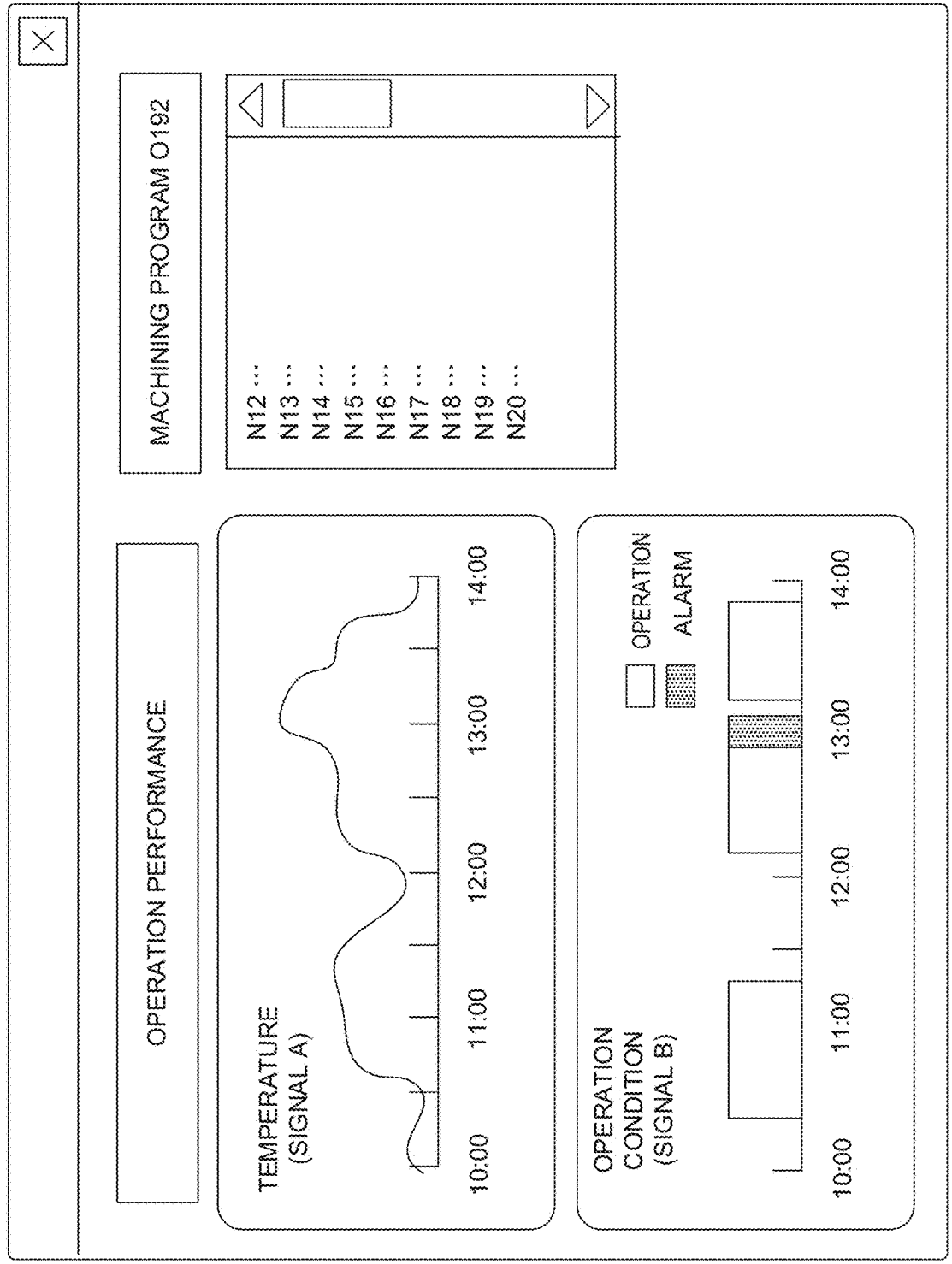
FIG. 4 is a diagram illustrating an example of a screen display by a search/display unit.

The search/display unit 130 is a functional means for displaying information related to machining program stored in the machining program information storage unit 200 and signaling information stored in the signaling information storage unit 210 to the display unit 20 in response to a request from a user. As shown in FIG. 4, the search/display unit 130, for example, displays signals stored in the signaling information storage unit 210 in a way that changes of each signal are easily grasped (a line chart, bar graph, time chart with a time on a horizontal axis, etc.). The search/display unit 130 displays, for example, information related to a machining program in text display as shown in FIG. 4.

Figure 5:
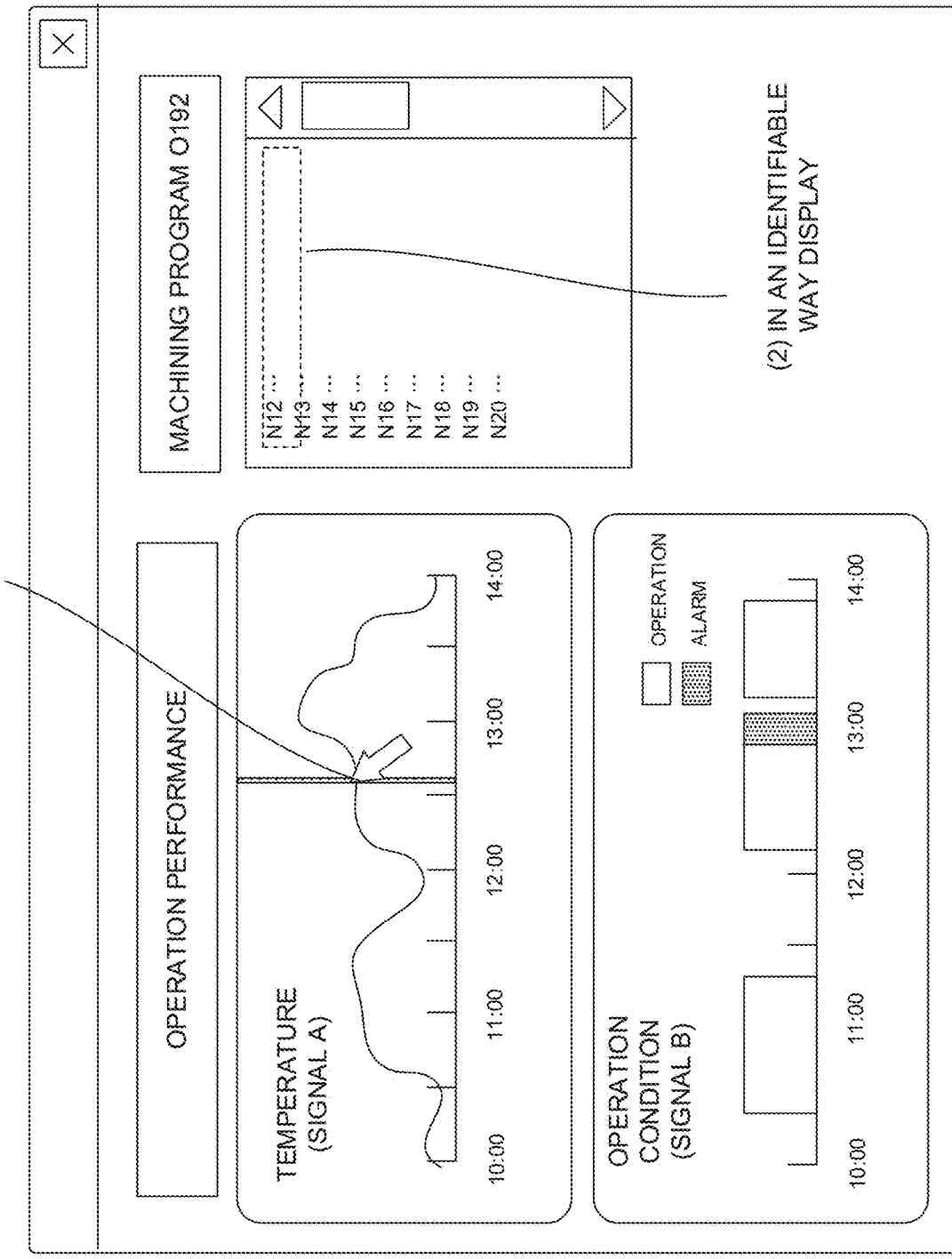
FIG. 5 is a diagram illustrating a display example of a machining program by a search/display unit at a time of signal selection.
Figure 6:
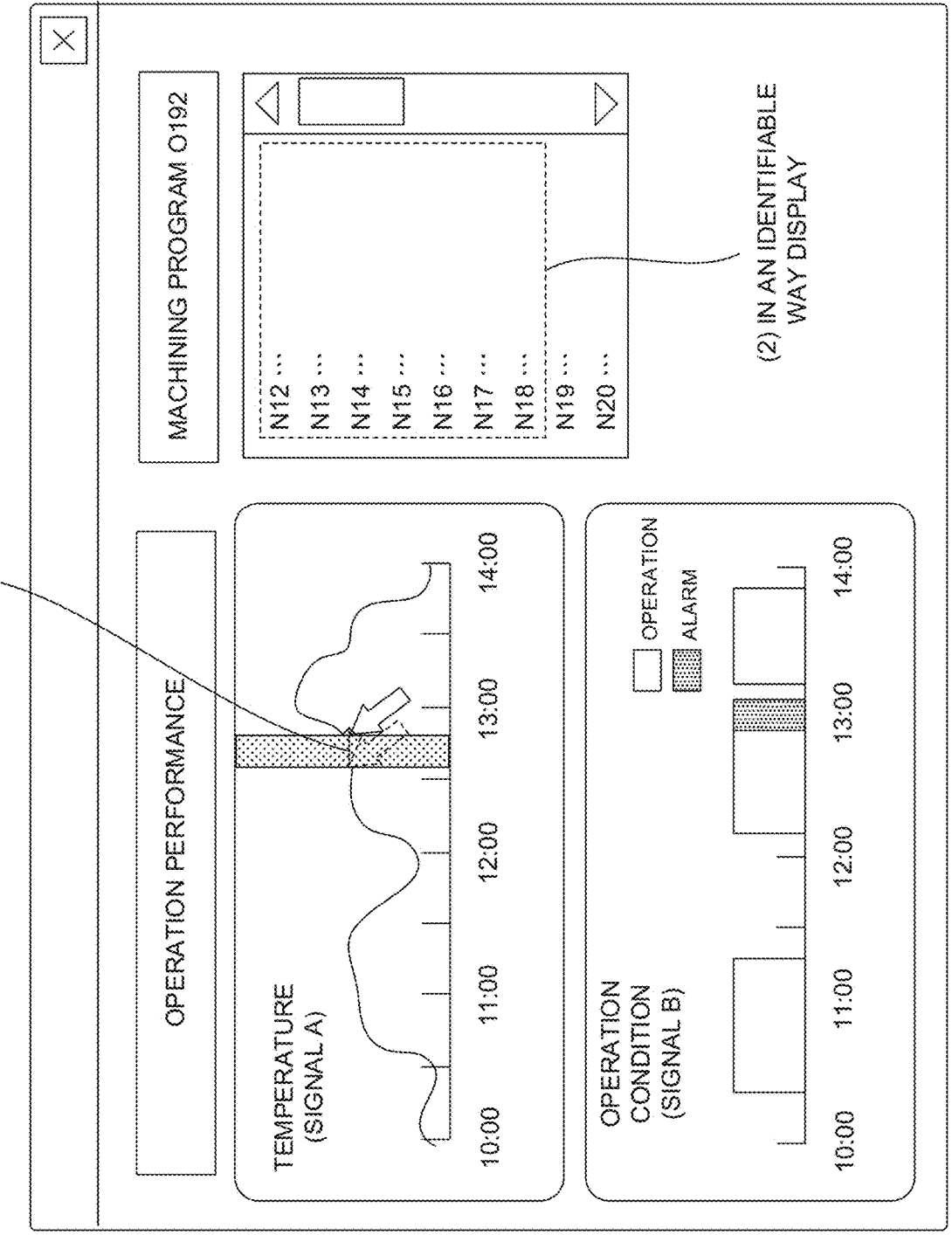
FIG. 6 is a diagram illustrating a display example of a machining program by a search/display unit when a range of a signal is selected.

As shown in FIG. 5, when a user selects a predetermined position of a signal displayed on the display unit 20 by operating the input unit 21 or the touch panel 22, the search/display unit 130 displays a block of a machining program associated with signaling information corresponding to the position of the user selected signal on the screen in a manner identifiable from other blocks. The search/display unit 130, for example, identifies the block of the machining program by searching the machining program execution performance information stored in the machining program information storage unit 200, using the block identifier associated with the signaling information corresponding to the position of the user selected signal, and displays the identified block of the machining program identifiably from other blocks. As shown in FIG. 6, when a user selects a range of a signal by a drag operation with the input unit 21 or the touch panel 22, the search/display unit 130 may display a plurality of blocks of the machining program corresponding to the range of the signal in a manner identifiable from other blocks.

Figure 7:
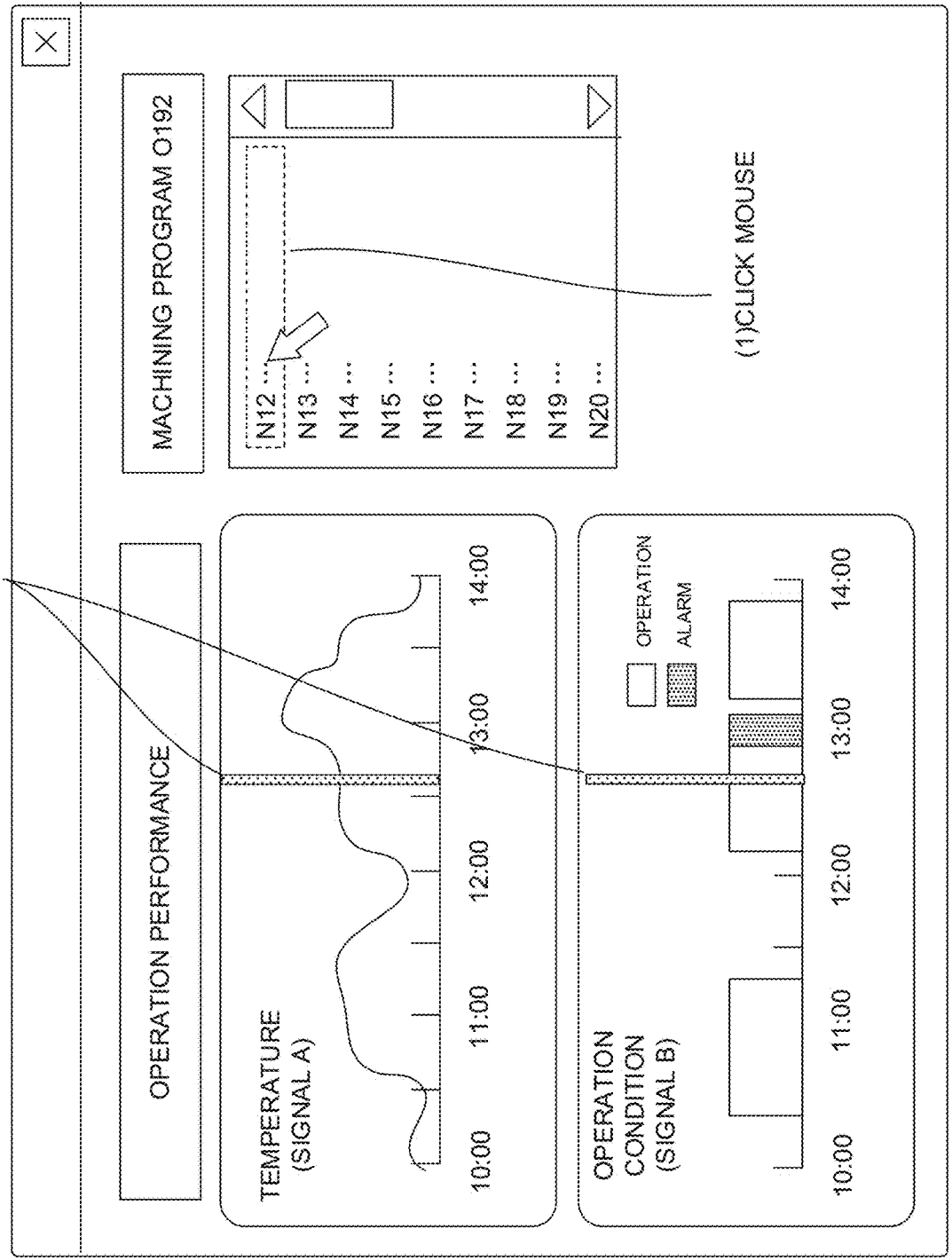
FIG. 7 is a diagram illustrating a display example of signals by a search/display unit at a time of block selection.
Figure 8:
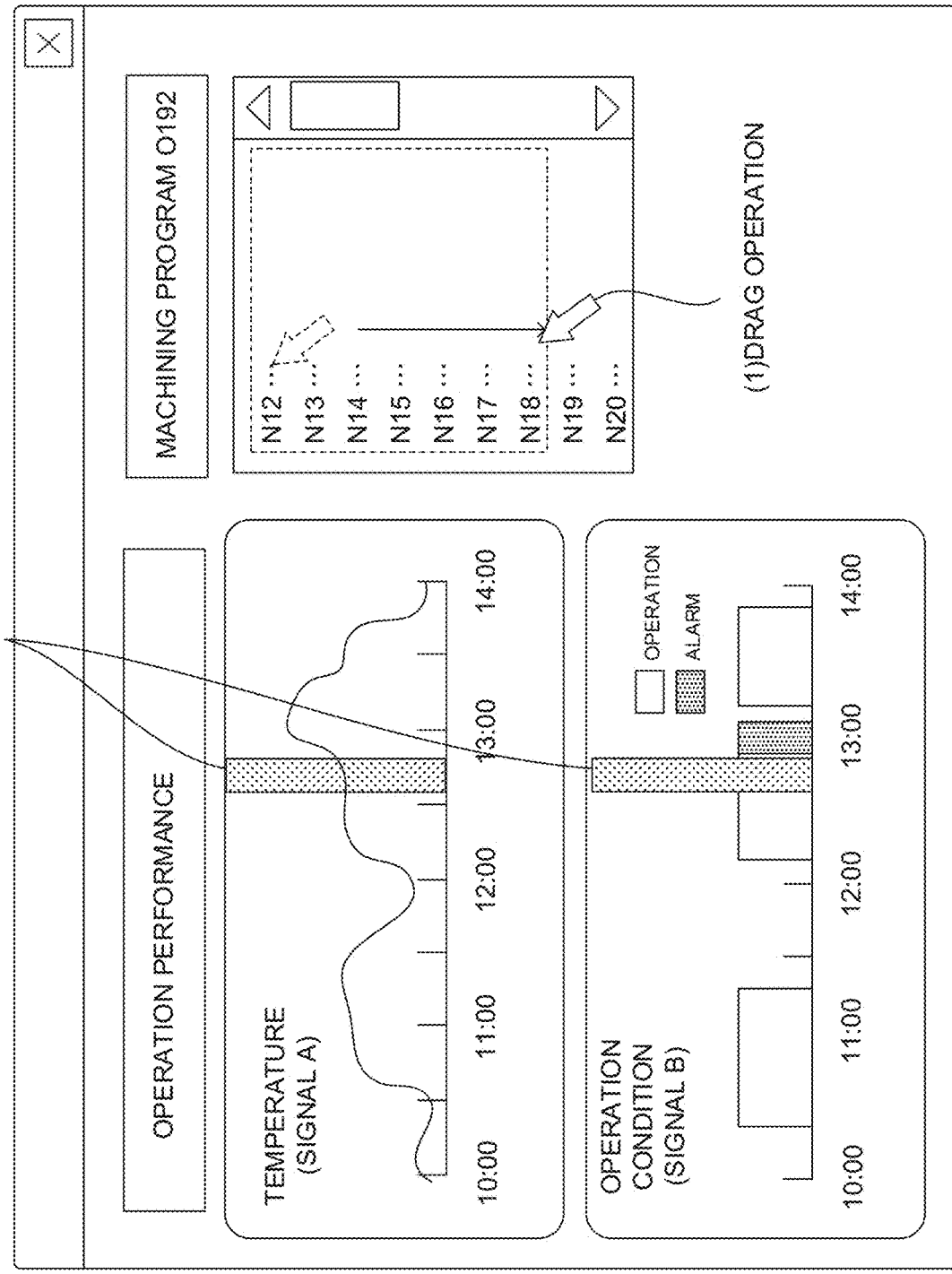
FIG. 8 is a diagram illustrating a display example of signals by a search/display unit when a range of blocks is selected.
Figure 9:
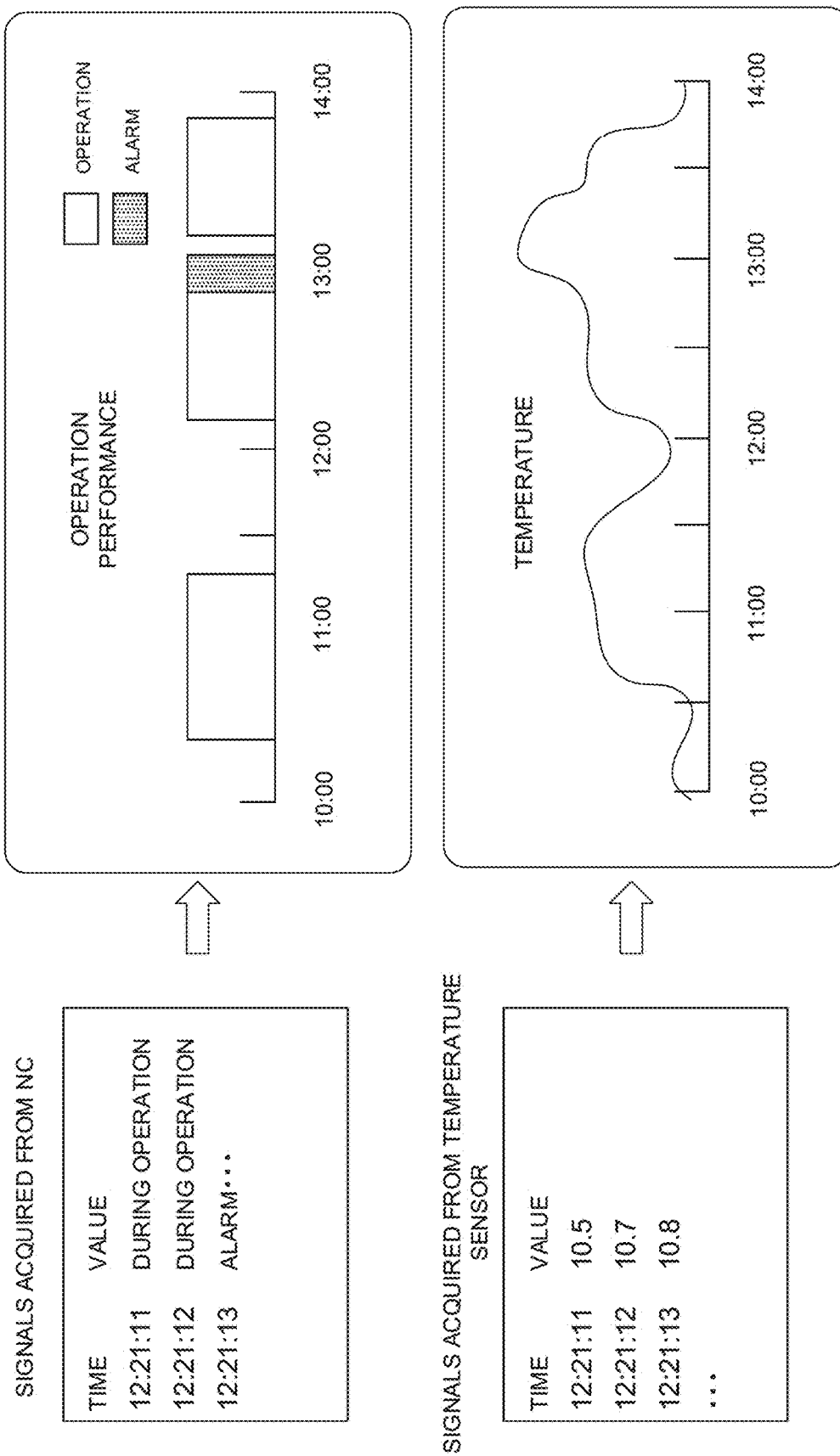
FIG. 9 is a diagram illustrating a display example of performance and various signaling information of a machine tool in accordance with the conventional art.

As shown in FIG. 7, when a user selects a block of a machining program displayed on the display unit 20 by operating the input unit 21 or the touch panel 22, the search/display unit 130 displays positions of signals corresponding to the user selected block on the screen in an identifiable manner. The search/display unit 130, for example, identifies the positions of the signals by searching signaling information stored in the signaling information storage unit 210, using the block identifier of the user selected block, and displays the positions of the identified signals in an identifiable manner. As shown in FIG. 8, when a user selects a range of blocks of a machining program by a drag operation with the input unit 21 or the touch panel 22, the search/display unit 130 may display ranges of signals corresponding to the range of the blocks in an identifiable manner.

Although one embodiment of the present invention is described above, the present invention is not limited to the example of the above-mentioned embodiment, and other embodiments can be implemented by introducing appropriate modifications.

What is claimed is:

1. An operation management device managing operation conditions of a machine tool, the operation management device comprising:
    a machining program information acquisition unit acquiring information related to machining program executed in the machine tool;
    a signaling information acquisition unit acquiring signaling information related to a signal detected during execution of the machining programs in the machine tool;
    an associated-information creation unit associating the information related to the machining program with the signaling information; and
    a search/display unit displaying the information related to the machining program and the signaling information, which are associated by the associated-information creation unit, in a manner such that they are associated with each other,
    wherein the associated-information creation unit is configured to
        add a first block identifier to each block among a plurality of blocks in the information related to the machining program executed in the machining tool, and
        add a second block identifier to the signal information, the second block identifier associated with the first block identifier and corresponding to a value of the signal, said value detected at a time when said each block is executed.

2. The operation management device according to claim 1,
    wherein the search/display unit is configured to display a block among the plurality of blocks, said block associated with a user-selected value of the signal, in a manner identifiable from other blocks among the plurality of blocks.

3. The operation management device according to claim 1,
    wherein the search/display unit is configured to display a value of the signal, said value associated with a user-selected block among the plurality of blocks, in an identifiable manner from other values of the signal.

4. The operation management device according to claim 1,
    wherein the search/display unit is configured to display blocks among the plurality of blocks, said blocks associated with a range of user-selected values of the signal in a manner identifiable from other blocks among the plurality of blocks.

5. The operation management device according to claim 1,
   wherein the search/display unit is configured to display a range of values of the signal, said values associated with user selected blocks among the plurality of blocks, in an identifiable manner from other values of the signal.

6. The operation management device according to claim 1,
   wherein, in response to selection of a value of the signal, the search/display unit is configured to
      identify, among the plurality of blocks in the information related to the machining program executed in the machining tool, a block associated with the selected value of the signal, by using the first block identifier associated with the second block identifier corresponding to the selected value of the signal, and
      display the identified block in a manner identifiable from other blocks among the plurality of blocks in the information related to the machining program executed in the machining tool.

7. The operation management device according to claim 1,
   wherein in response to selection of a block among the plurality of blocks in the information related to the machining program, the search/display unit is configured to
      identify a value of the signal by using the first block identifier added to the selected block, and
      display the identified value of the signal in a manner identifiable from other values of the signal.

* * * * *